(12) United States Patent
Cooke

(10) Patent No.: US 9,280,490 B2
(45) Date of Patent: Mar. 8, 2016

(54) SECURE COMPUTING

(71) Applicant: Laurence H. Cooke, Los Gatos, CA (US)

(72) Inventor: Laurence H. Cooke, Los Gatos, CA (US)

(*) Notice: Subject to any disclaimer, the term of this patent is extended or adjusted under 35 U.S.C. 154(b) by 338 days.

(21) Appl. No.: 13/864,688

(22) Filed: Apr. 17, 2013

(65) Prior Publication Data

US 2014/0317419 A1    Oct. 23, 2014

(51) Int. Cl.

| | |
|---|---|
| *G06F 11/30* | (2006.01) |
| *G06F 12/14* | (2006.01) |
| *G06F 12/08* | (2006.01) |
| *G06F 21/52* | (2013.01) |
| *G06F 9/30* | (2006.01) |
| *G06F 21/75* | (2013.01) |
| *G06F 21/85* | (2013.01) |

(52) U.S. Cl.
CPC ........ *G06F 12/1408* (2013.01); *G06F 9/30178* (2013.01); *G06F 12/0875* (2013.01); *G06F 21/52* (2013.01); *G06F 21/75* (2013.01); *G06F 21/85* (2013.01); *G06F 2212/402* (2013.01); *G06F 2212/452* (2013.01); *G06F 2221/2125* (2013.01)

(58) Field of Classification Search
CPC .............. G06F 12/1408; G06F 21/602; G06F 2212/1052; G06F 21/6218; G06F 2221/2107
USPC ........................................................ 713/193
See application file for complete search history.

(56) References Cited

U.S. PATENT DOCUMENTS

| | | | |
|---|---|---|---|
| 7,412,468 B2 | 8/2008 | Butler | |
| 7,657,756 B2 | 2/2010 | Hall | |
| 7,734,932 B2 | 6/2010 | Buer | |
| 7,865,733 B2 | 1/2011 | Goto et al. | |
| 2002/0107903 A1* | 8/2002 | Richter | H04L 12/2602 709/201 |
| 2005/0105738 A1* | 5/2005 | Hashimoto | G06F 21/72 380/277 |
| 2009/0282178 A1* | 11/2009 | Kailas | G06F 13/364 710/244 |
| 2009/0293130 A1 | 11/2009 | Henry et al. | |
| 2009/0319673 A1* | 12/2009 | Peters | H04W 4/08 709/228 |
| 2010/0192014 A1 | 7/2010 | Mejdrich et al. | |
| 2011/0296204 A1 | 12/2011 | Henry et al. | |
| 2012/0079281 A1 | 3/2012 | Lowenstein et al. | |
| 2012/0096282 A1 | 4/2012 | Henry et al. | |
| 2013/0067245 A1 | 3/2013 | Horovitz et al. | |

OTHER PUBLICATIONS

Int'l Search Report and Written Opinion issued Nov. 13, 2014 in Int'l Application No. PCT/US2014/031396.

* cited by examiner

*Primary Examiner* — Kambiz Zand
*Assistant Examiner* — Stephen Sanders
(74) *Attorney, Agent, or Firm* — Panitch Schwarze Belisario & Nadel LLP

(57) ABSTRACT

Techniques and logic are presented for encrypting and decrypting programs and related data within a multi-processor system to prevent tampering. The decryption and encryption may be performed either between a system bus and a processor's individual L1 cache memory or between a processor's instruction and execution unit and their respective L1 caches. The logic may include one or more linear feedback shift registers (LFSRs) that may be used for generation of unique sequential address related codes to perform the decryption of instructions and transformation logic that may be used for generation of equivalent offset address related codes to perform decryption and encryption of data. The logic may also be programmable and may be used for test purposes.

11 Claims, 10 Drawing Sheets

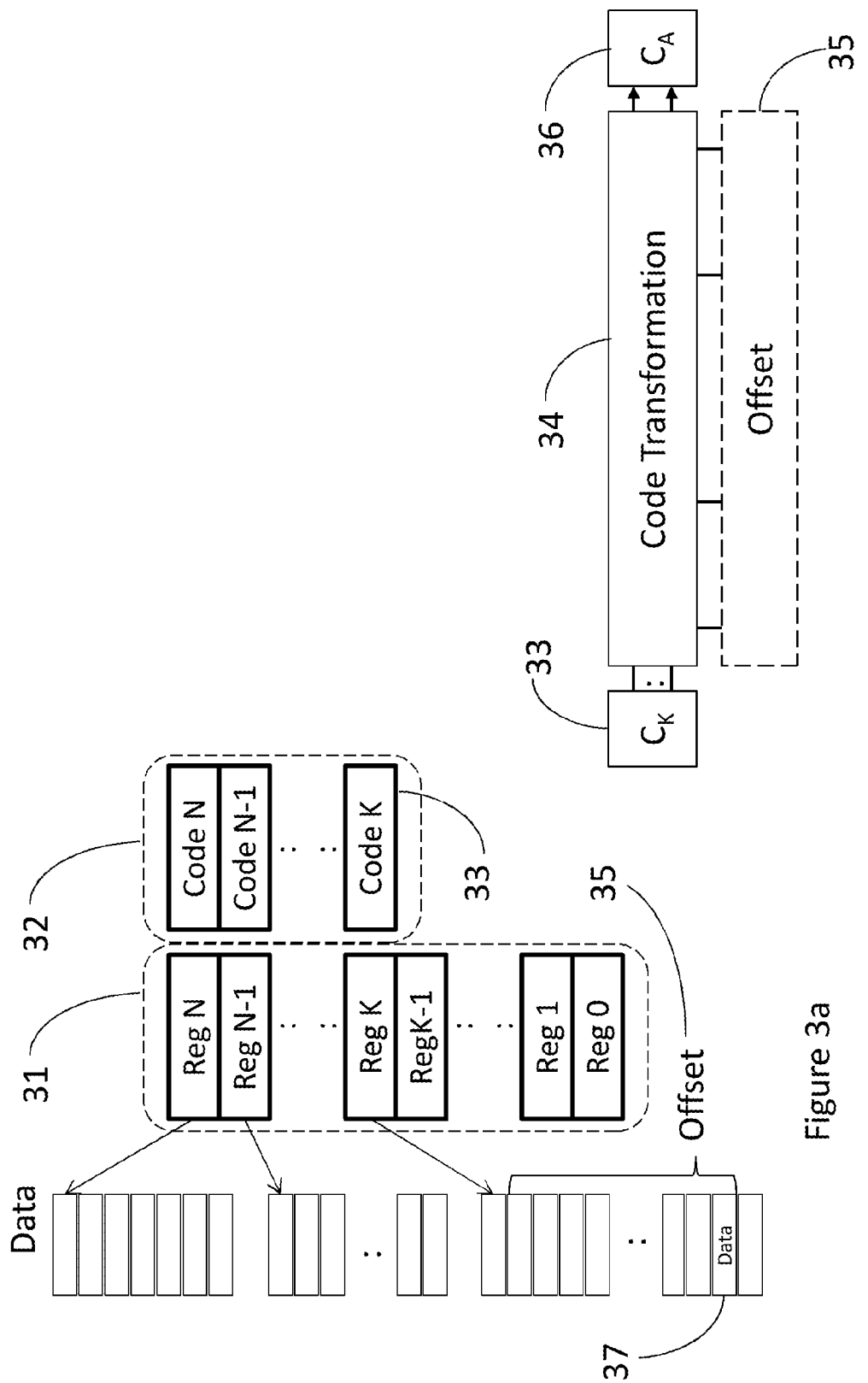

SECURE COMPUTING

FIELD OF THE INVENTION

Embodiments of the present invention may relate to processing encrypted code and data in a secure manner in a processor.

BACKGROUND OF THE INVENTION

With the frequent stories of hacking personal information of millions of customers and clients of corporations and government, data and computer security have become significant issues in computing. Organizations, such as the Trusted Computing Group, have created a number of standards for secure authentication to decrypt privileged information. HDMI and other standard communication protocols have methods for encrypting and decrypting privileged data as well, but all these solutions deal with encrypting transmitted or stored data, not the actual code and data used in the actual computer, which has left a gap where hackers may be able to get access to decrypted information within the computing systems themselves. Goto et al., in U.S. Pat. No. 7,865,733 granted Jan. 4, 2011, suggests securely decrypting data received from any external memory into the processor chip, and encrypting any data being sent off of the processor chip to external memory, and Buer, in U.S. Pat. No. 7,734,932 granted Jun. 8, 2010, suggests a solution by leaving the data and instruction encrypted in main memory, decrypting it when fetched into cache. Furthermore, while Hall, in U.S. Pat. No. 7,657,756 granted Feb. 2, 2010, suggests storing the metadata for decryption in cache, it is along with the decrypted data. These may address the problem of single-threaded, single processors residing, with their own cache on secure integrated circuits (ICs), but that is not the state of all computing, e.g., cloud computing, today. Most of today's servers contain multiple ICs, each with multiple processors and multiple levels of shared cache, processing potentially different applications on virtual machines in the same chip. In this environment, one application may snoop another application within the same chip, and may do so well enough to hack it.

Convolution encrypting the source code, while helpful, may still be decrypted by detecting the frequency of the instruction codes. Other techniques such as decrypting the instruction by applying the XOR of the encrypted instruction and one or more fixed keys such as described by Henry et al., in US Patent Application Publication No. 2011/0296204, published Dec. 1, 2011, are only as good as the keys. A sufficiently robust encryption technique may be needed to be adequately tamper proof. Such a technique should be sufficiently random to be difficult to break. Butler, in U.S. Pat. No. 7,412,468 granted Aug. 12, 2008, suggested using a Multiple Input Shift Register (MISR), also known as a linear feedback shift register (LFSR), for both built-in self test (BIST) and the generation of random keys for encryption, which he suggested may be applied to external messages using a form of Rivest-Shamir-Adelman (RSA) encryption. Unfortunately. Butler's encryption approach may require too much computational overhead for encoding and decoding a processor's instructions and data, as may other software-based encryption techniques, such as that described by Horovitz et al, in US Patent Application Publication No. 2013/0067245, published Mar. 14, 2013; and while Henry et al., in US Patent Application Publication No. 2012/0096282, published Apr. 19, 2012, suggest using the NOR operations to decrypt in the "same time" as not decrypting, they still require additional instructions to switch their encryption keys. Therefore, in order to provide an adequate tamper proofing mechanism for cloud computing, in multi-processor systems with shared cache memory systems, it may be desirable to employ a pseudo-random key based technique for transparently encoding and decoding instructions and data with annul overhead, with in individual processors, such that protected applications and data may remain encrypted in shared memory spaces.

SUMMARY OF EMBODIMENTS OF THE INVENTION

Various embodiments of the invention may relate to hardware and software encryption and decryption techniques using pseudo-random numbers generated by LFSRs for use in both testing a processor's hard are and protect a processor's data and instructions in shared memory by encrypting and decrypting the data and instructions between the processor are all shared memory.

In one embodiment, a multi-processor system, e.g., on an IC, may have two or more processors, here each processor may include an instruction unit for processing instructions, an execution unit for operating on data, at least one cache memory, at least one interface to a system bus, logic for translating instructions accessed by the instruct on unit from a cache memory and logic between the execution unit and a cache for translating data, where the translating may use pseudo random numbers. The logic for translating instructions may include logic for decrypting encoded instructions, and the logic for translating data may include logic for decrypting data being accessed the execution unit and logic for encrypting data being written to the cache. The logic for translating instructions may hide a LFSR, and the logic for translating data may include code transformation logic. The logic translating data may also include logic for selectively encrypting data written to system bus. The cache memories may include an instruction cache and a data cache. The logic for translating instructions may access the instruction cache, and the logic to translating data may access the data cache.

In another embodiment a multi-processor system, e.g., on an IC, may have two or more processors, where each processor may include an instruction unit for processing instructions, an execution unit for operating on data, at least one cache memory, at least one interface to a system bus, and logic for translating data and instructions transferred between the system and a cache memory. The logic for translating instructions may include logic for decrypting encoded instructions, and the logic for translating data may include logic for decrypting data being accessed by the execution unit and logic for encrypting data being written to the cache.

In another embodiment is method for encrypting a program's instructions and data may include the steps of:
a) creating initial codes and loading an LFSR with one of the initial codes;
b) for each instruction, incrementing an LFSR function to obtain its translation code;
c) for each data space, defining a translation code, loading an LFSR with the translation code, and incrementing the LFSR, to obtain the translation code for each predefined data element;
d) for each selected instruction, appending a translation code corresponding to the value in the selected instruction's address field, to the selected instruction;
e) encoding each instruction, data and appended translation code with the translation code associated with its address; and
f) separately encrypting the initial codes.

The selective instructions may include instructions for loading and storing registers containing addresses, branch instructions, and instructions for calling and returning from subroutines. The LFSR may be a programmable LFSR, and the step of creating initial codes may include programming the LFSR with one of the initial codes.

In another embodiment, debugging unencrypted applications may be performed without recompiling the application or altering the encrypted application's cycle-by-cycle operation, e.g., by using zero translation codes.

In yet another embodiment, instructions to generate the data for transform mask registers, which define the programming of code transformation logic from an LFSR's mask register bits, may be encrypted, appended in front of the encoded application, and may be executed following the loading of the LFSR mask register and initial translation code. The transform mask registers' data may be generated by:

A) rotating an identity matrix down one row after ORing the LFSR mask register bits into the first bits of the last column to obtain the transform mask register data for the first transformation function, B) modulo 2 multiplying in matrix form, the first transformation function's transform mask register data with itself to obtain the second transformation function's transform mask register data, and C) obtaining each successive transformation function's mask register data by matrix multiplying modulo 2, the previous transformation function's transform mask register data with itself.

Finally, in another embodiment, an LFSR, code transformation logic, and checksum logic may be used to generate random instructions and data to test the processor prior to normal operation.

BRIEF DESCRIPTION OF DRAWINGS

Various embodiments of the invention will no be described in connection with the attached drawings, in which:

FIGS. 3a, 3b, and 3c are diagrams of examples of data encryption and decryption using offset translated codes associated with base addresses of the data.

DESCRIPTION OF VARIOUS EMBODIMENTS

Embodiments of the present invention are now described with reference to FIGS. 1a-9, it being appreciated that the figures may illustrate the subject matter of various embodiments and may not be to scale or to measure.

Figure 1A:
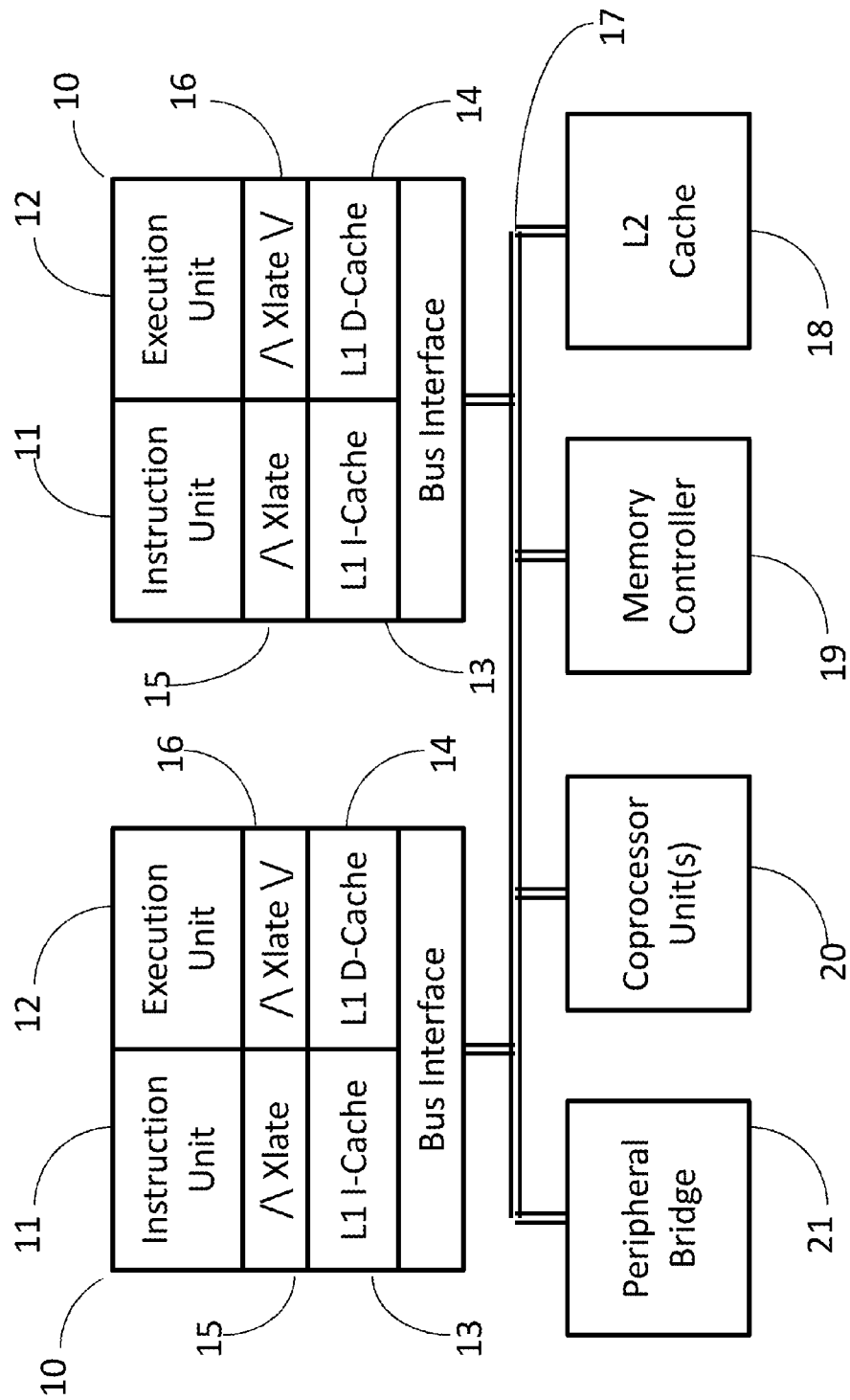
FIGS. 1a and 1b are conceptual diagrams of exam multi-processor systems with encryption and decryption translators.

Reference is made to FIG. 1a, a conceptual diagram of an example of a multi-processor system with encryption and decryption. The system may include two processors 10 connected via a common system bus 17 to a shared L2 cache 18 and/or other devices, such as a memory controller 19, one or more co-processor(s) 20, and/or a bridge to more peripheral devices 21. Each processor 10 may include an instruction unit 11 and its corresponding L1 I-cache 13 with a translator 15 for decrypting the instructions being read into the I-cache coupled between them. In a similar manner, each processor 10 may contain an execution unit 12 and its corresponding L1 D-cache 14 with another translator 16 for encrypting and decrypting data being read into and written out of the D-cache coupled between them. The instructions and data may be decrypted as they are read out of their respective L1 caches, and selected decrypted data may be sent past the L1 D-cache 14 to the bridge 21 and co-processors 20, while maintaining the encrypted data in the cache.

Figure 1B:
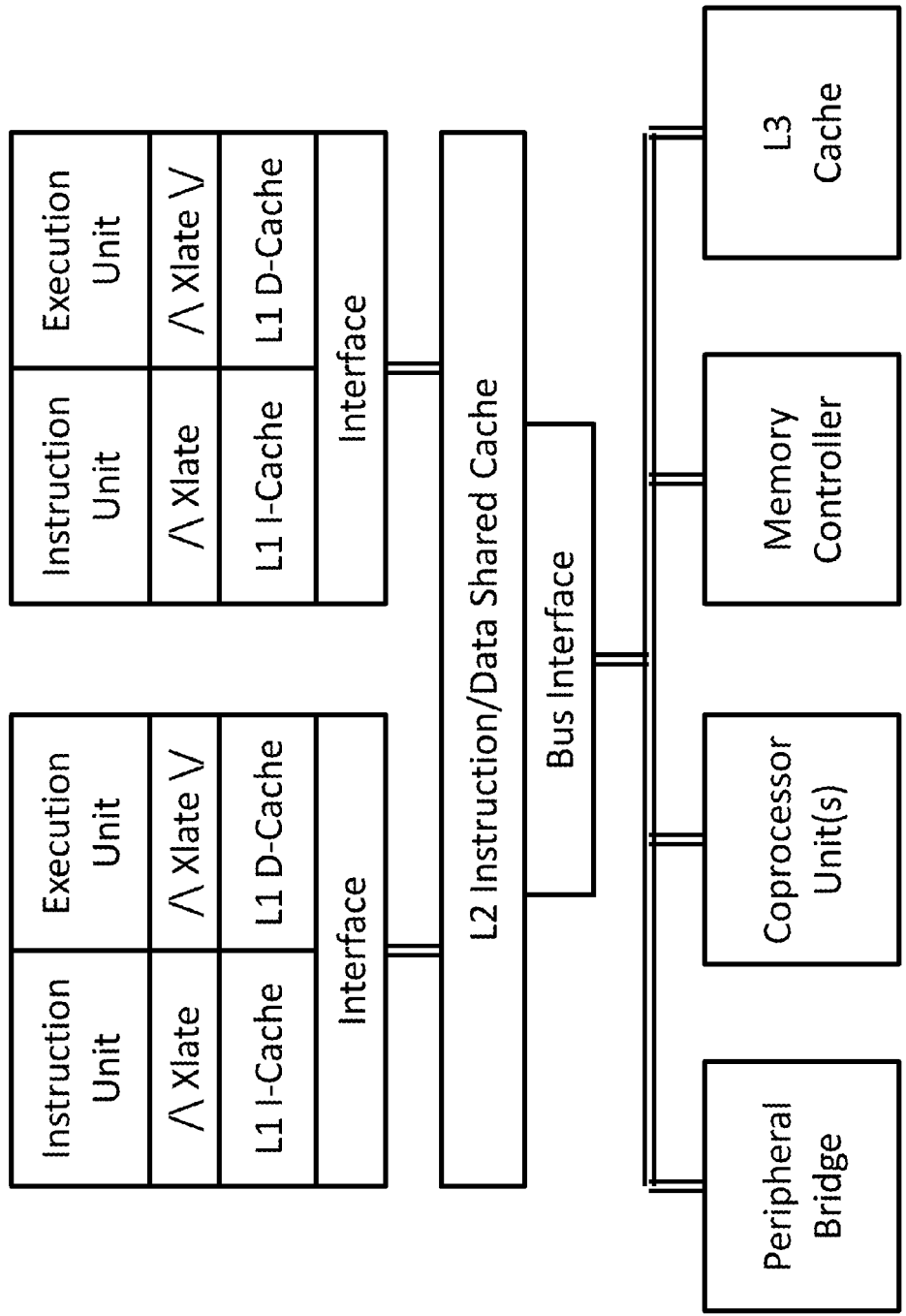

The architecture shown in FIG. 1a may have processors with reduced instruction set computing (RISC) and instructions that use base register pins index addressing, but it is further contemplated that LFSR encryption and decryption of individual processor instructions and data may be employed in other processor architectures, such as complex instruction set computing (CISC) with direct addressing modes, and a system architecture, including but not limited to the one shown in FIG. 1b.

Figure 2B:
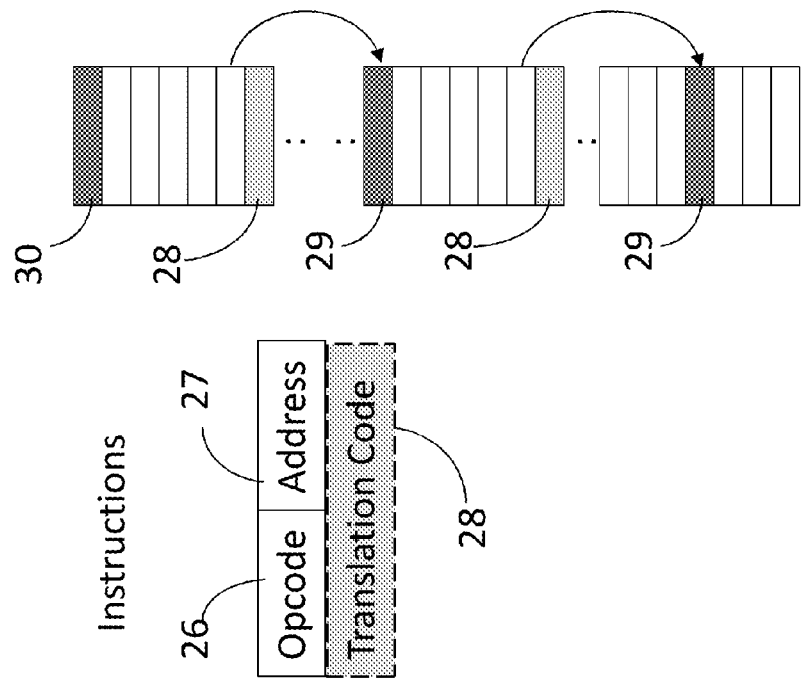
FIGS. 2a and 2b are diagram of examples of instruction decryption using an LFSR in conjunction with instructions.
Figure 2A:
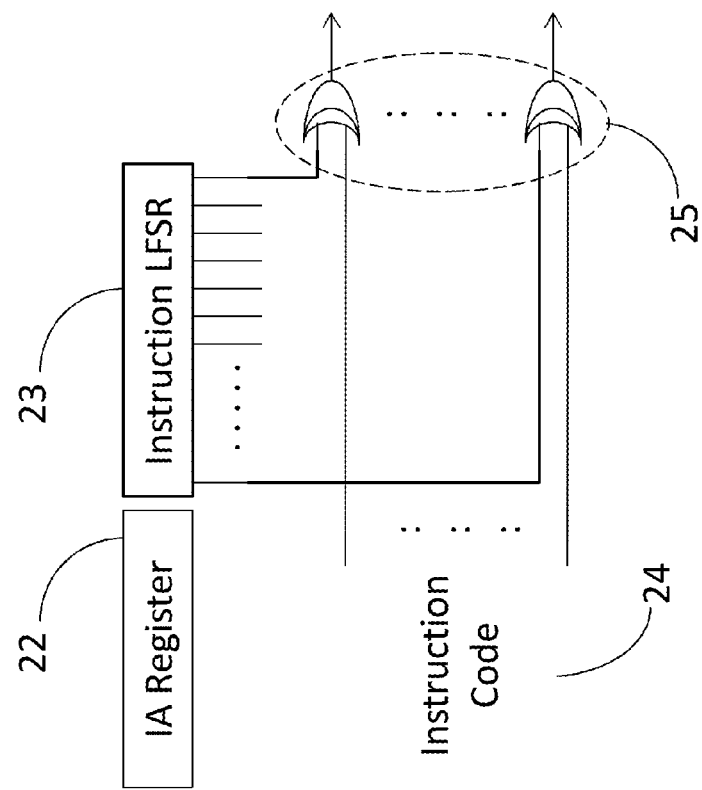

Returning to the system architecture shown in FIG. 1a, reference is now made to FIG. 2a a diagram of an example at instruction decryption using an LFSR in conjunction with an instruction address register. For every instruction address register 22, there may be an instruction LFSR 23 containing a code that may be used to decrypt the encoded Instructions 24 using a set of exclusive-OR gates 25. The instruction LFSR 23 may be clocked each time the instruction address register 22 is incremented thereby providing each instruction with a unique code from which the instruction may be decoded. In this manner, each occurrence of an instruction may be encoded and decoded differently, thereby obscuring the actual instruction's identity.

Reference is now made to FIG. 2b, a diagram of an example of instruction memory including branch instructions. The normal instructions may consist of opcode 26 and address 27 fields. The address fields may contain offsets from base register addresses for accessing data. In addition, selected instructions may also include translation codes 28. The fields and translation codes may initially be encrypted and may be decrypted before being used. One such selected instruction, the branch instruction, may load both the instruction address register and the instruction LFSR while executing the branch, such that the instruction LFSR may contain the proper code for the next instruction 29 after taking the branch. In the case in which the branch is not taken, the instruction address register may be incremented, and the LFSR may be clocked to provide the proper code for decrypting the next instruction. Subsequent incrementing of the instruction address register and clocking of the LFSR may occur until the instruction 29 may be reached, at which point the contents of the LFSR may match the decrypted translation code 28 of the corresponding branch instruction. An initial translation code for the first instruction 30, and other data, may be obtained by the operating system through some separate secure encryption protocol, such as RSA, which may be loaded into the instruction LFSR using a branch to the first instruction.

As mentioned above, some encrypted instructions may include translation codes, which may also be encrypted, thereby securing all but the initial translation code for the first instruction. In this manner, the proper translation code for each instruction may be easily obtained in one clock cycle by either loading or clocking the LFSR.

Unfortunately, in a random access memory, data may not be accessed sequentially, thereby requiring a way to directly calculate the proper translation code from the address of the data. So, with regard to the system architecture shown in FIG. 1a, reference is now made to FIGS. 3a, 3b and 3c, diagrams of examples of data encryption and decryption using offset translated codes associated with base addresses of the data. Each processor may contain a set of N registers 30, where the first K registers may be used to hold data, and the last N−K base registers may contain addresses pointing to one or more sections of data and/or instruction code. The processor may further contain N−K translation code registers 31, which may correspond to the N−K base registers. When an executed instruction loads or stores data from or to a memory location, it may calculate the address of the memory location by adding an offset to the address within a base register. The translation code corresponding to that address may be calculated by transforming the code from the translation code associated with the base register by the amount of the offset, thereby creating a code for decrypting or encrypting the corresponding data. For example, the translation code for a location 37 with an offset 15 from the address in base register K may be calculated by loading the offset 35 and the translation code from code register K 33 into the code transformation logic 34, producing a translation code in register 36 for the location 37, which, when applied to the exclusive-ORs 38 in FIG. 3c, may decrypt or encrypt the data 39 being loaded from or stored into location 37. It may be noted that, for any given target address, the same translation code may be used to encrypt and decrypt data being put into or taken from the target address. Furthermore, the same translation code result as obtained through the code transformation logic 34 may be obtained by loading a properly wired LFSR with the translation code from code register K and clocking the LFSR by a count equal to the offset 35. In addition, multiplexors 40 may be used to select the unencrypted data 39 when sending the data to either the co-processors 20 in FIG. 1a or other peripheral devices through the peripheral bridge 21 in FIG. 1a, or to other locations that may require decrypted data. Furthermore, the multiplexors 40 in FIG. 3c may continue to select the encrypted data when sending the data either back to the caches 14 and 18 in FIG. 1a or to main memory through the memory controller 19 in FIG. 1a. Such selection may be done by a select line 41 in FIG. 3c, which may be driven either from a control register (not shown) or by control bits within the instructions themselves.

In addition to branches, instructions for loading a base register's address may also load the base register's associated code register. In a similar manner, a subroutine call may store the translation code associated with the instruction in the instruction LFSR after saving the prior contents of the LFSR in the code register associated with the base register where it stores its return address. Similarly, a return instruction may branch to the address in the base register while loading the contents of the corresponding code register into the instruction LFSR.

Initial encryption of the instructions in a program and data space may be performed after compilation and before the final load module creation, e.g., by: creating an initial translation code; incrementing the LFSR function to obtain the translation code for each instruction; defining a translation code for each data space; incrementing the LFSR function to obtain the translation code for each predefined data element; appending to selected instructions the translation code corresponding to the value in the address field of those instructions; and encoding each instruction, data and appended translation code with the translation code associated with its address. The instructions requiring appended translation codes may include instructions invoking addresses in base registers, branches and/or subroutine calls.

Figure 4:
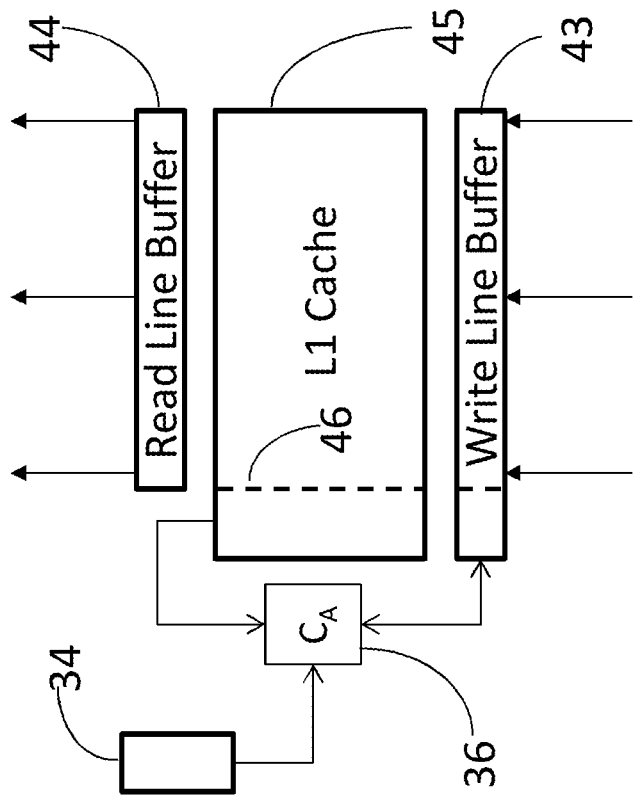
FIG. 4 is a simplified diagram of an example of a L1 data cache.
Figure 3C:
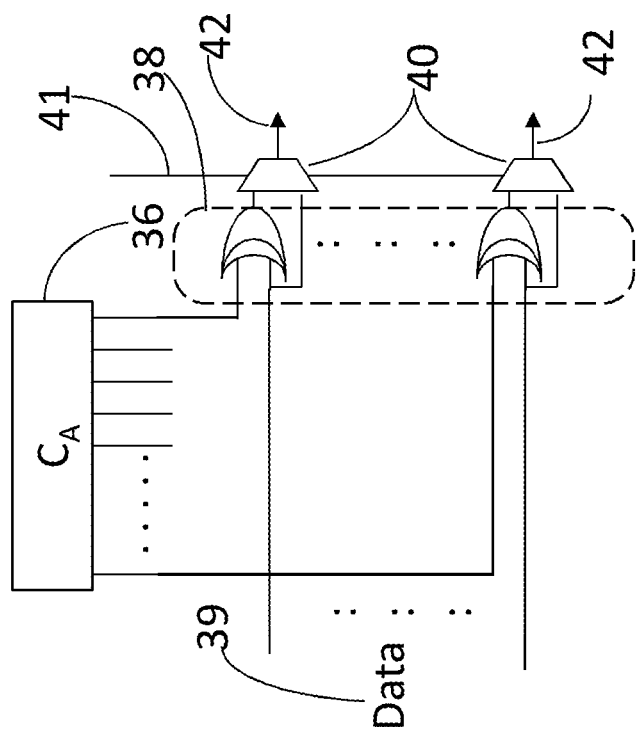

Reference is now made to FIG. 4, a simplified diagram of an example of a L1 data cache. The L1 Cache 45 may be coupled to both a write line buffer 43 and a read line buffer 44. In one embodiment, the contents of the data cache may be encrypted in a manner similar to the system architecture shown in FIG. 1a, and the read line buffer 42 may be coupled to the data inputs 39 in FIG. 3c for decryption of the encrypted data. The write line butter 43 may also be connected to the outputs 42 in FIG. 3c for re-encryption of updated data and may be configured to read the register 36, to load the associated translation code into a portion of the data cache 46 along with the encrypted updated data. Part of the write line buffer 43 may also be connected to read the output register 36 following execution of the code transformation logic 34. In this manner, on a cache line miss, the translation code associated with the new cache line data may be generated while the data portion of the write line buffer 43 may be filled from external cache or memory. Similarly, the translation code may be read from a section of the cache 46 into the register 36 to subsequently translate the read line buffer's 44 data for the execution unit. Finally, when other devices stoop the L1 Cache, they may only extract encrypted data.

In another embodiment, the contents of the L1 cache may be decrypted in the system architecture depicted in FIG. 1a. In this case, the processor may not decrypt the data or instructions from the cache. Rather the translation code 36 for the address of the data or instructions being written into the write line buffer may be used to decrypt the data or instructions and may be subsequently stored in a code portion 46 of the cache along with the decrypted data. When the cache is snooped by another processor, the translation code associated with the data may be used to encrypt the snooped data.

Furthermore, it is contemplated that an LFSR, starting with a translation, code for the first instruction or word of data in a cache line buffer, may be clocked and applied to each subsequent instruction or word of data being read from or written into the cache line buffer. If the read or write is out of order, the translation code may be adjusted by a single transformation function that may "subtract" the buffer size from the LFSR when the data or instructions wrap around the line buffer. Given an LFSR function with M unique values before repeating, "subtraction" of N is equivalent to a transformation function of M−N, where M>N.

Figure 5:
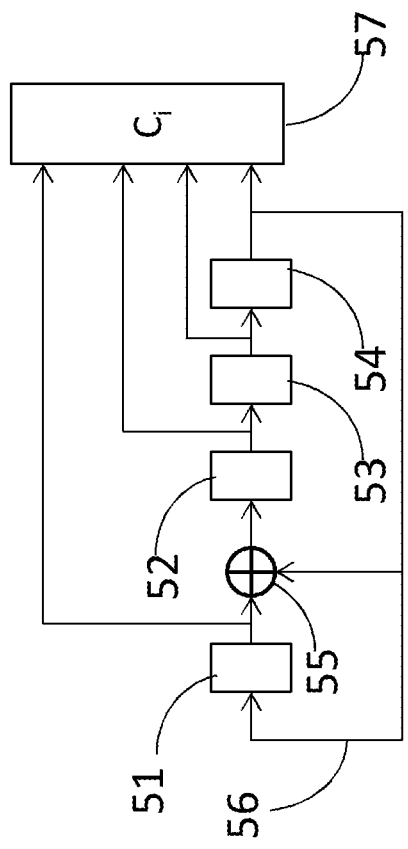
FIG. 5 is a diagram of an example four-bit Galois LFSR.

A simple four-bit example may be used to clarify the structure and functional operation of both an LFSR and its associated code transformation logic. Reference is now made to FIG. 5, a diagram of an example four-bit Galois LFSR composed of four flip-flops 51-54 serially coupled in a ring, with one exclusive-OR gate 55 connected between the first flip-flop 51 and the second flip-flop 52, and a feedback loop 56 connecting the fourth flip-flop 54 to the exclusive-OR 55 and the first flip-flop 51, where the outputs of all the flip-flops are coupled to a code register 57. This particular LFSR may be used to generate all fifteen distinct non-zero translation codes (i.e., all fifteen distinct non-zero combinations of four bits) before repeating.

Figure 6A:
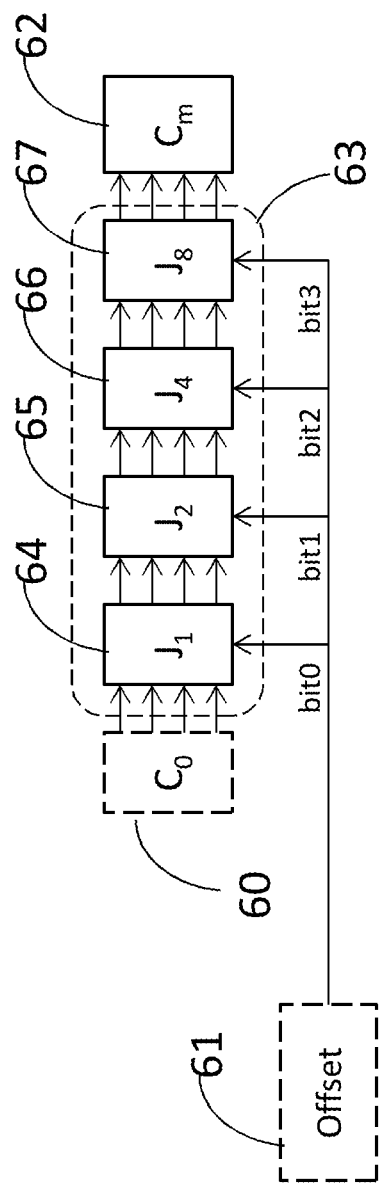
FIG. 6a is as high level diagram of code translation based on the example LFSR.

Reference is now made to FIG. 6a, a high level diagram of an example of offset translation based on the example LFSR of FIG. 5. Given an initial translation code corresponding to a specific address, M clocks may be used to generate the translation code for an address of the Mth word after the specific address. Alternatively, the initial translation code $C_0$ 60 may applied with an offset value 61 to code transformation logic 63 to produce a translation code $C_M$ in an output code register 62, which corresponds to the translation code the Mth word after the specific address. The code transformation logic may produce translation code $C_M$ by successively, for each set (i.e., "1" or "high"), or alternatively, clear (i.e., "0" or "low") bit in an Nth position of the binary offset value, transforming the initial translation code by a function that is equivalent to clocking the LFSR by $2^N$ times. For any four bit offset, the code transformation logic may transform the translation code by some combination of the transformation functions: J1 (one clock) 64, J2 (two clocks) 65, J4 (four clocks) 66 and/or J8 (8 clocks) 67.

Figure 6B:
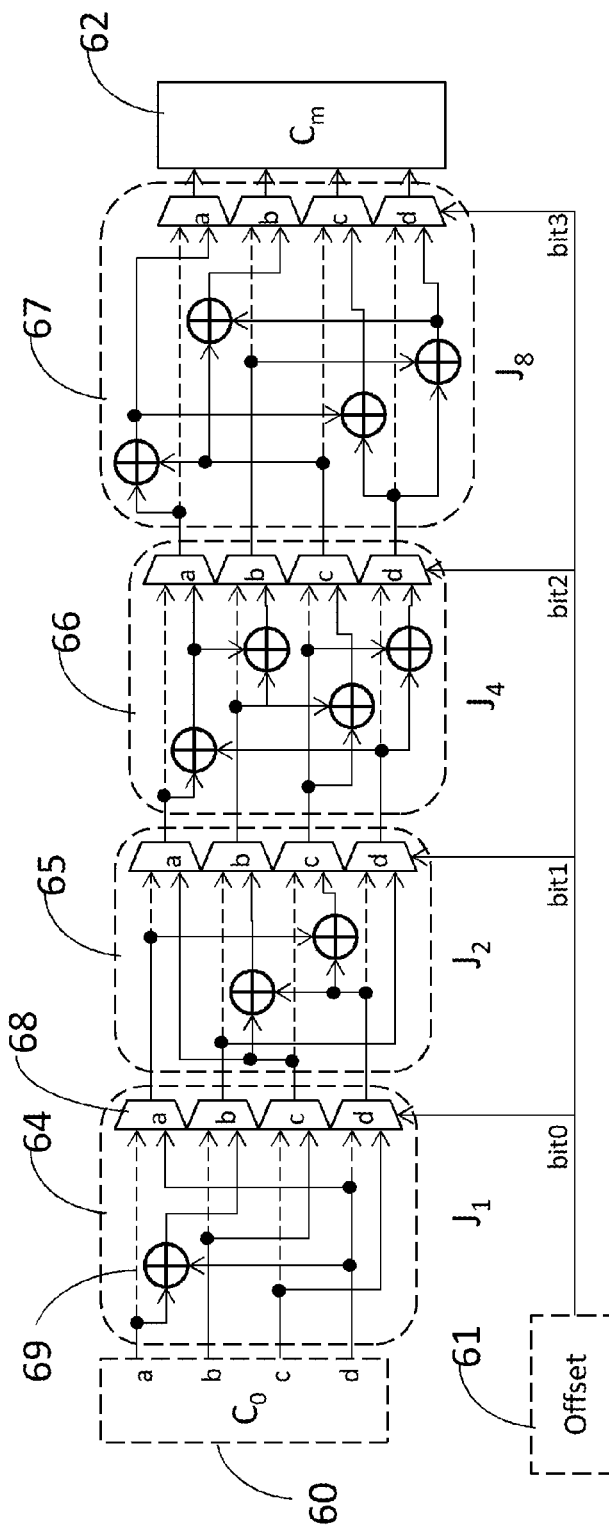
FIG. 6b is a detailed diagram of the code transformation logic example.
Figure 7:
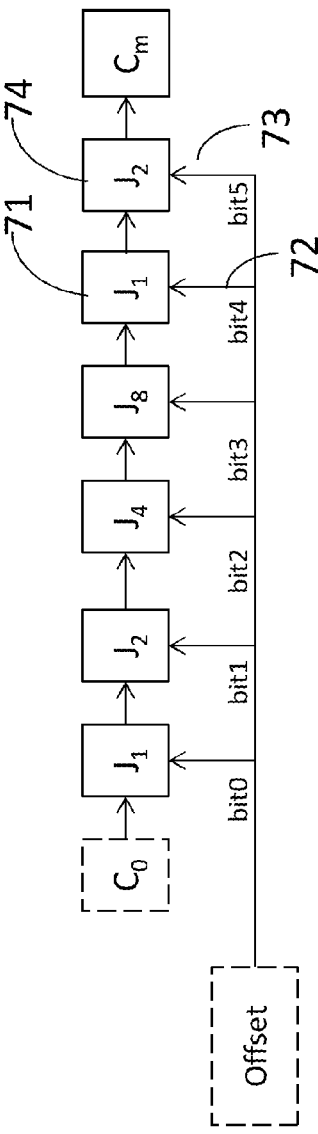
FIG. 7 is another high level diagram of a code transformation example extended offset addressing.

Reference is now made to FIG. 6b, a detailed diagram of the code transformation logic example, showing details of an example of a hardware implementation of the code transformation logic 63. Each of the functions J1 through J8 may be comprised of exclusive-OR gates 69 and multiplexors 68. The function J1 64 may select the four bits from $C_0$ 60 if the lowest order bit from the offset 61 is low, and may select the same values the LFSR would generate in one clock cycle if the lowest order bit from the offset 61 is high. Note that the second bit is the exclusive-OR 69 of the first and fourth bits, as would be captured in the second flip-flop 51 of the LFSR in FIG. 5 after one clock. Similarly, the function J2 65 may select between its input values if bit of the offset is low and the same values the LFSR would generate after two clock cycles, which is equivalent to two cycles of J1, if bit1 of the offset is high. In this manner, each respective bit of the offset selects a corresponding function equivalent to clocking the LFSR by the number of clock cycles corresponding to the position of the offset bit, depending on whether the respective offset bit is high or low. Clearly, by the logic in FIG. 6b, an offset of zero would make $C_M=C_0$, but an offset of 15 would also be equivalent to no change because the LFSR cycles through only 15 numbers, so $C_{15}=C_0$. This can be shown by the following derivation:

Given the inputs for Jx are a0, b0, c0 and d0 and the outputs are ax, bx, cx, dx, letting the symbol "<-" representing assigning the expression of inputs on the right to the output on the left, and letting "+" represent an exclusive-OR operation, and given:

J1 is a1<-d0, b1<-(a0+d0), c1<-b0, d1<-c0;
J2 is a2<-c0, b2<-(c0+d0), c2<-(a0+d0), d2<-b0;
J4 is a4<-(a0+d0), b4<-((a0+d0)+b0), c4<-(b0+c0), d4<-(c0+d0); and
J8 is a8<-(a0+c0), b8<-((b0+d0)+c0), c8<-((a0+c0)+(d0), d8<-(b0+d0); then
J15 is a15<-a0, b15<-b0, c15<-c0, d15<-d0; so $C_{15}=C_0$ In the case where the offset may be larger than the size of the non-repeating numeric sequence of the LFSR, it may possible to reduce the logic of the higher order transformation functions. Reference is now made to FIG. 7, a diagram of a code transformation logic example with a six-bit offset. In this case, because the LFSR shown in FIG. 5 has a repeating sequence of fifteen numbers, the transformation function equivalent to clocking the LFSR sixteen times is the same as clocking the LFSR once. Therefore, the transformation function 71 may be control led by the offset bit 72 corresponding to $2^4=16$, but 16-15-1 is the J1 (one clock) transformation function. Similarly, the fifth bit 73 may control the transformation function 74 corresponding to $2^5=32$, but 32-2*15=2 is the J2 (two clock) transformation. The same type of modulo calculation may be applied to generate code transformation logic for any LFSR with any size offset.

Figure 8:
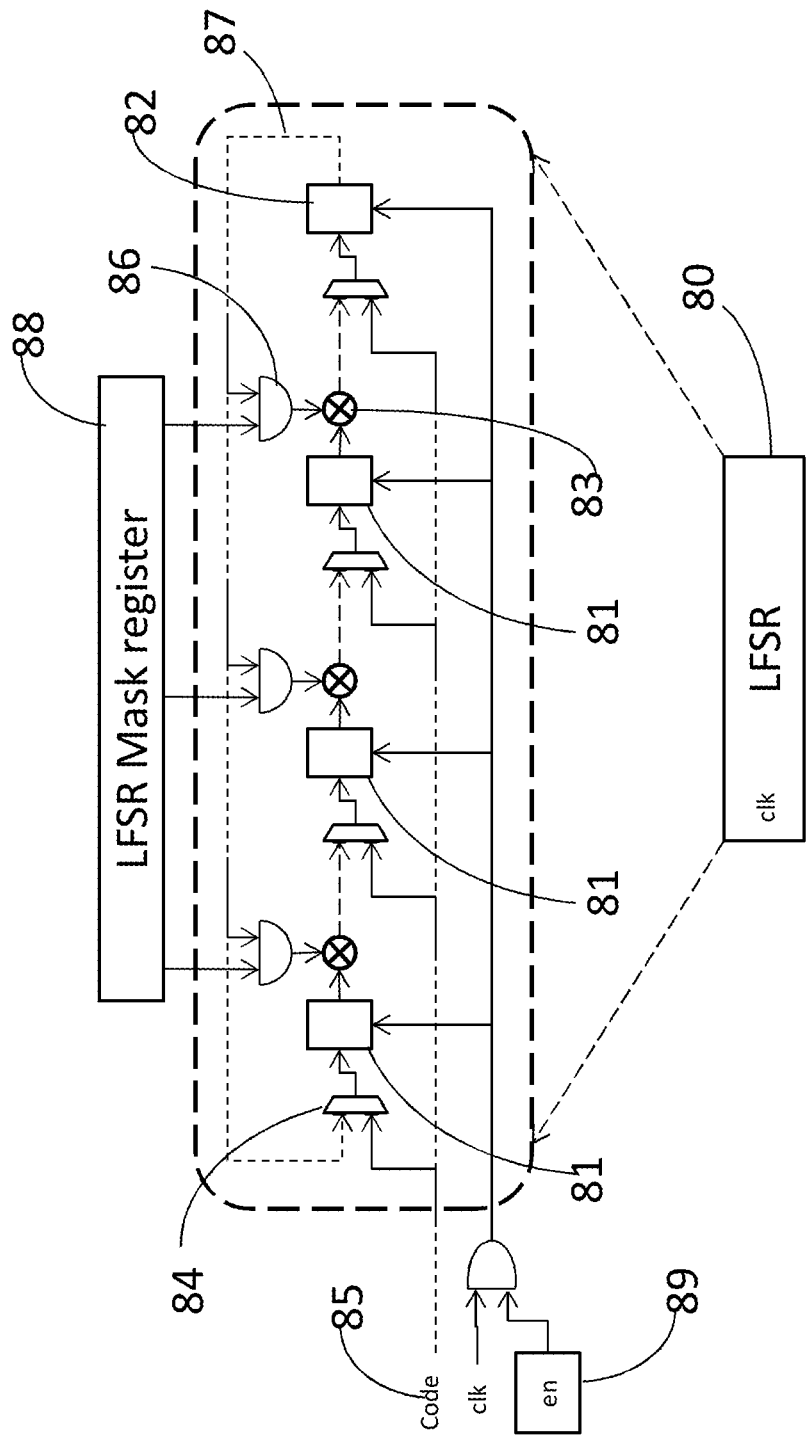
FIG. 8 is a diagram of an example of a programmable Galois LFSR.

While the above techniques may provide reasonably strong encryption when using large LFSRs, the encryption may be weaker for smaller LFSRs. One solution may be to expand the number of potential repeating sequences by making the LFSRs and code transformation logic programmable. Reference is now made to FIG. 8, a diagram of an example of a programmable Galois LFSR. The LFSR 80 may contain any number of flip-flops 81 serially coupled in a ring, where each flip-flop, except the last flip-flop 82, may drive an exclusive-OR gate 83, and all may be driven by a multiplexor 84, which may select between loading a code 85 into the LFSR or sequencing the LFSR. Each exclusive-OR gate 83 may also be driven by an AND gate 86, which may be used to enable the signal on the feedback line 87 with a bit from an LFSR mask register 88. The LFSR mask register 88 may contain N−1 bits for an N flip-flop LFSR. The LFSR mask register bits may be loaded with any Galois LFSR configuration. The LFSR may be clocked on all increments of the instruction address register, thereby stepping through the LFSR states. In any one of the ideal configurations, the LFSR may repeat every state possible except zero. Loading a zero code into the LFSR may be equivalent to no decryption, given that no amount of clock may change the state of the LFSR and that no bits are changed when exclusive-ORed with zero.

Therefore, in another embodiment, the LFSRs and all decryption may be disabled by loading translation codes of zero. This may be performed, e.g., when exiting an encrypted application.

Figure 9:
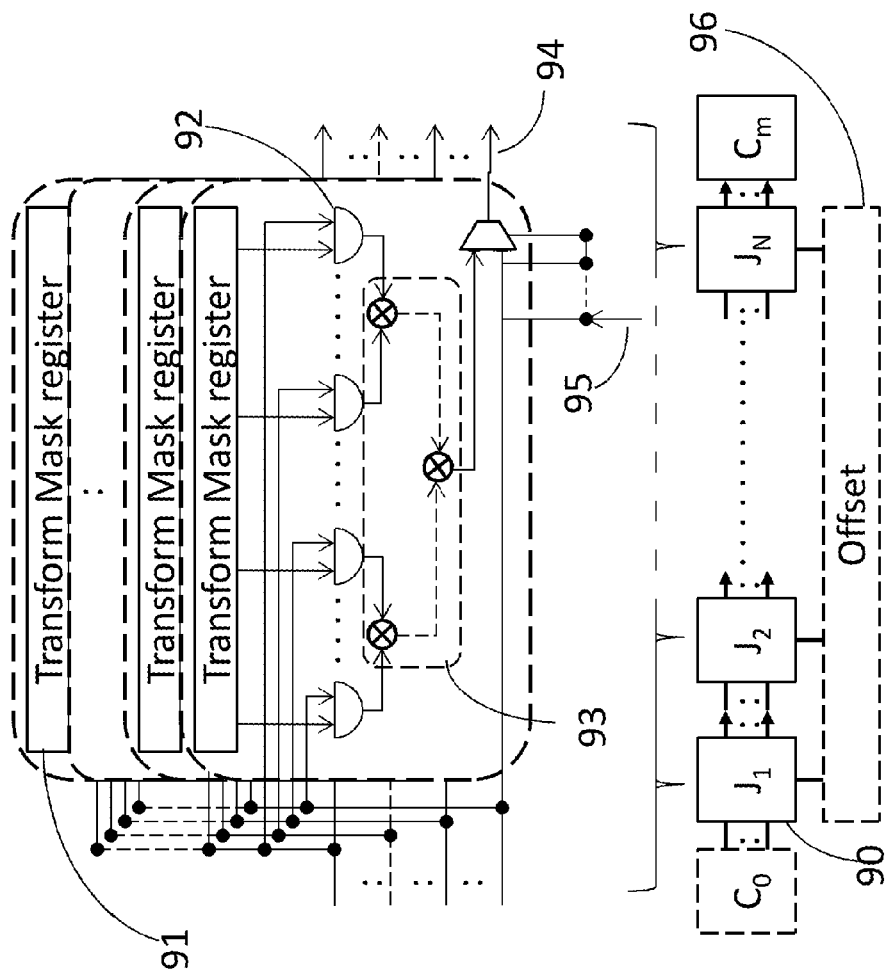
FIG. 9 is a diagram of an example of programmable code transformation logic.

Reference is now made to FIG. 9, a diagram of an example of programmable offset translation logic. Each respective transformation function 90 may include N transform mask registers 91 of N bits each, where N is the number of flip-flops in the corresponding LFSR. There may be one transform mask register for each output of the transformation function. Each of the bits in the transform mask registers may be used to select, via an AND gate 92, a corresponding input to the transformation function. The selected inputs may be exclusive-ORed, through a tree of exclusive-OR gates 93, to form the output 94 selected by a bit 95 from the offset 96. For an LFSR with N flip-flops, programmable code transformation logic for an N-bit offset may require up to $N^3$ programming bits. It should be noted that the transformation functions selected by all offset bits above N may be copies of the first N transformation functions, thereby requiring no additional programming bits.

The actual number of unique bits required to program the code transformation logic may be much less than $N^3$. First, a should be noted that the transform mask register bits for the first transformation function, when viewed as an N×N matrix, may be generated by rotating an identity matrix down one row after ORing the N−1 LFSR mask register bits into the first bits of the last column, in a manner that properly simulates one clock shift of the associated LFSR. The second transformation function's matrix may be generated by multiplying modulo 2 the first transformation function's matrix by itself, the third transformation function's matrix may be generated by multiplying modulo 2 the second matrix by itself, and each successive transformation function's matrix may be generated from the matrix of the previous transformation function in the same manner. As such, the $N^3$ programming bits of a programmable code transformation function may be generated with as few as N−1 programmable bits, or may, with appropriate logic, only require N−1 programmable bits.

Assuming a programmable version of the LFSR in FIG. 5 and the code transformation logic in FIGS. 6a and 6b, the process to generate programming bits for the code transformation logic may be as follows:

Given the 3 LFSR bits are [1 0 0], the single shift matrix [J1] may be:

$$\begin{bmatrix} 0 & 0 & 0 & 1 \\ 1 & 0 & 0 & 1 \\ 0 & 1 & 0 & 0 \\ 0 & 0 & 1 & 0 \end{bmatrix} \times \begin{bmatrix} a \\ b \\ c \\ d \end{bmatrix} = \begin{bmatrix} d \\ a+d \\ b \\ c \end{bmatrix}$$

The matrix for two shifts [J2] may be:

$$\begin{bmatrix} 0 & 0 & 0 & 1 \\ 1 & 0 & 0 & 1 \\ 0 & 1 & 0 & 0 \\ 0 & 0 & 1 & 0 \end{bmatrix} \times \begin{bmatrix} 0 & 0 & 0 & 1 \\ 1 & 0 & 0 & 1 \\ 0 & 1 & 0 & 0 \\ 0 & 0 & 1 & 0 \end{bmatrix} = \begin{bmatrix} 0 & 0 & 1 & 0 \\ 0 & 0 & 1 & 1 \\ 1 & 0 & 0 & 1 \\ 0 & 1 & 0 & 0 \end{bmatrix} \times \begin{bmatrix} a \\ b \\ c \\ d \end{bmatrix} = \begin{bmatrix} c \\ c+d \\ a+d \\ b \end{bmatrix}$$

The matrix for four shifts [J4] may be:

$$\begin{bmatrix} 0 & 0 & 1 & 0 \\ 0 & 0 & 1 & 1 \\ 1 & 0 & 0 & 1 \\ 0 & 1 & 0 & 0 \end{bmatrix} \times \begin{bmatrix} 0 & 0 & 1 & 0 \\ 0 & 0 & 1 & 1 \\ 1 & 0 & 0 & 1 \\ 0 & 1 & 0 & 0 \end{bmatrix} = \begin{bmatrix} 1 & 0 & 0 & 1 \\ 1 & 1 & 0 & 1 \\ 0 & 1 & 1 & 0 \\ 0 & 0 & 1 & 1 \end{bmatrix} \times \begin{bmatrix} a \\ b \\ c \\ d \end{bmatrix} = \begin{bmatrix} a+d \\ a+b+d \\ b+c \\ c+d \end{bmatrix}$$

And the matrix for eight shifts [J8] may be:

$$\begin{bmatrix} 1 & 0 & 0 & 1 \\ 1 & 1 & 0 & 1 \\ 0 & 1 & 1 & 0 \\ 0 & 0 & 1 & 1 \end{bmatrix} \times \begin{bmatrix} 1 & 0 & 0 & 1 \\ 1 & 1 & 0 & 1 \\ 0 & 1 & 1 & 0 \\ 0 & 0 & 1 & 1 \end{bmatrix} =$$

$$\begin{bmatrix} 1 & 0 & 1 & 2 \\ 2 & 1 & 1 & 3 \\ 1 & 2 & 1 & 1 \\ 0 & 1 & 2 & 1 \end{bmatrix} = \begin{bmatrix} 1 & 0 & 1 & 0 \\ 0 & 1 & 1 & 1 \\ 1 & 0 & 1 & 1 \\ 0 & 1 & 0 & 1 \end{bmatrix} \times \begin{bmatrix} a \\ b \\ c \\ d \end{bmatrix} = \begin{bmatrix} a+c \\ b+c+d \\ a+c+d \\ b+d \end{bmatrix}$$

In the above equations, "+" is an XOR function, and the modulo 2 operation is explicitly shown only for the last equation.

It is further contemplated that the LFSR mask register bits needed for programming the LFSR may not be the bits used to program the transformation functions, thereby providing different encryption algorithms for the instruction and data. Such additional mask register bits may also be included with the initial translation code.

It is also contemplated that the mask register bits may be encrypted with the initial translation code, and prior to executing the encrypted program, the mask register data may be decrypted by loading the initial translation code into the LFSR, using the initial translation code to decode the mask register data without clocking the LFSR, and then loading the LFSR's decrypted mask register data.

It is also contemplated that instructions to generate the data for the transform mask registers from the LFSR's mask register bits may be encrypted, appended in front of the encoded application, and may be executed following the loading of the LFSR mask register and initial translation code. It should be noted that this code may not address data memory, which may require the use of the yet-to-be-programmed code transformation logic. As such, all transform mask registers may be directly addressable by instructions, and all generation of the transform mask register data may be done in situ, thereby avoiding use of addressed data memory.

Furthermore, it is contemplated that the processor's legal instruction codes may be a small fraction of the possible values in the opcode field of an instruction. Upon incorrect decryption, the execution of an illegal instruction may cause an operating system interrupt, thereby allowing the operating system to detect instruction tampering. Similarly, by maintaining legal memory space or spaces that are small relative to the full address space, illegal addresses may also cause operating system interrupts, thereby allowing the operating system to detect data tampering.

A Practical Example

Small examples, such as those above, may be useful for illustrating, the detailed logic, but in current more realistic multi-processor environments, a practical example may be a 32-bit RISC processor with 20-bit offset address fields in the instructions and multiple levels of cache. In this example, the instructions and data may remain encrypted within their respective caches, the LFSR may be 32 bits long, and the LFSR mask register may be 31 bits long, both manageable sizes of separately encrypted initial codes. Once loaded, the longest path between flip-flops on the programmable LFSR may be an AND gate followed by XOR gate, and loading the LFSR may also only take one clock cycle; hence, the decryption of the instructions may easily occur during the instruction unit's fetch cycle. For branch look-ahead techniques or intermediate loop instruction storage, the proper decrypted translation codes for each stream may be stored with the branch predictions or loop instructions.

The data code transformation logic may be much larger. The offset address field may contain a 20-bit offset, which may result in 20 transformation functions, each of which may have 32 bits of 32 AND gates masking the input signals to a 6-level tree of 31 XOR gates. Each of the 20 transformation functions may then contain eight levels of logic (1 AND, 6 XORs and 1 multiplexor), for a total of 1,024 AND gates, 992 XOR gates, 32 multiplexors, and 32 32-bit transform mask registers. The worst-case path in such a structure may be up to 160 gate levels long. This may be reduced where the terms are not needed, but the result may still require many clock cycles. Still, the time needed to calculate the proper cache line translation code may overlap with the time required to process a cache line miss request to either an L2 cache or main memory, which also may take many clock cycles. Upon receiving the externally requested cache line, the translation code may be stored in the L1 data cache with the encrypted cache line. Upon a subsequent cache hit, the translation code may be retrieved to decrypt the data retrieved from the cache or to encrypt the data written to the cache, as shown in FIG. 4. To save space, the translation code stored in the cache may be only applicable to the first word in a $2^K$ word cache line, A K-bit code transformation logic block may then be used to create the translation code for the proper word out of the cache line, or a combination of a K-M bit code transformation logic block and $2^M$ cycles of an appropriately loaded LFSR may be used. It should be noted that, because of the short path within the LFSR, the LFSR may also be clocked at a multiple of the processor clock.

In yet another embodiment of the present invention, the mask register and code transformation logic may be reduced by limiting the programming to a subset of the bits.

Debug and Test

In another embodiment, debugging of applications may be performed without recompiling the application or altering its cycle-by-cycle operation. Unencrypted applications may also be modified before the final load module creation, e.g., by creating a zero initial translation code and appending to the selected instructions a zero translation code. Execution of the unencrypted application may then be performed with all the available transparent debug facilities as may exist in the processor, and with the translation logic enabled. Furthermore, the unencrypted code may then perform in the same cycle-by-cycle manner as the encrypted code. Similarly, when subsequently encrypting the application, or re-encrypting the application, its size and cycle-by-cycle operation may not change.

Figure 11:
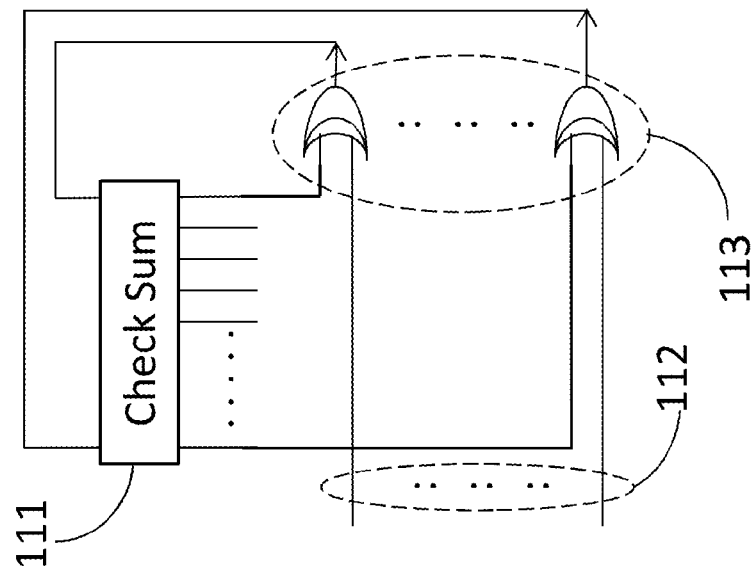
FIG. 11 is a diagram of an example of checksum logic.
Figure 10:
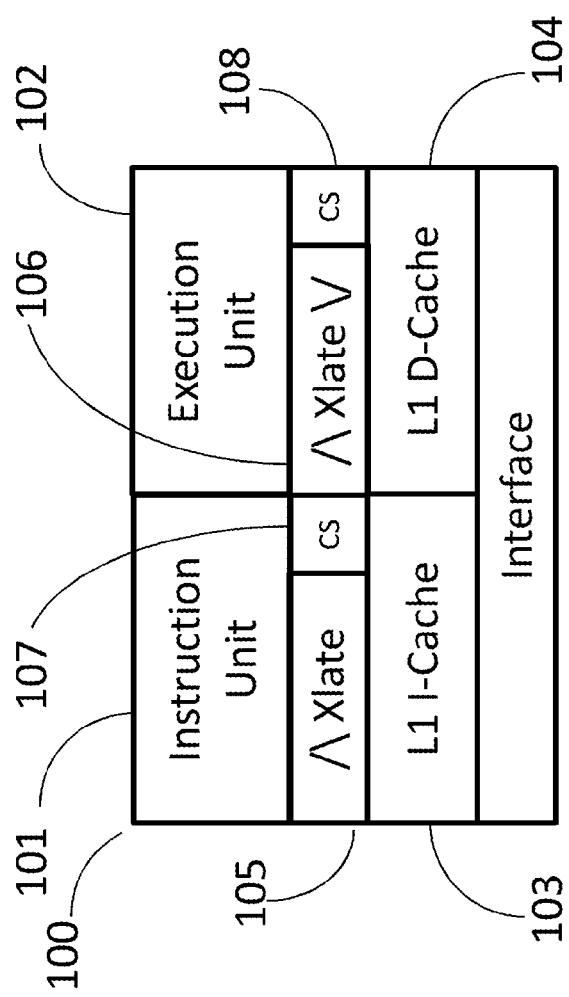
FIG. 10 is another diagram of an example of a processor with checksum logic.

In another embodiment, the LFSR, code transformation logic, and checksum logic may be used to generate random instructions and data to test the processor prior to normal operation. Reference is now made to FIG. 10, another diagram of an example of a processor 100 with checksum logic 107 coupled to the output of the instruction unit 101 and checksum logic 108 coupled to the output of the execution unit 102. To initiate LFSR-generated processor BIST, the L1 caches 103 and 104 may be initialized to zero. Reference is now made to FIG. 11, a diagram of an example of checksum logic. The checksum register 111 may be cleared or loaded with an initial code. On each clock cycle, the input data 112 may be combined with the current contents of the checksum register 111 through exclusive-OR (XOR) gates 113 to update the checksum register 111. The input data 112 may be instructions or control signals from the instruction unit or may be data and control signals from the execution unit. Testing may proceed by:
  a) Loading an LFSR translation code and an initial instruction address,
  b) Disabling cache misses by loading just the translation codes and addresses,
  c) Clearing and disabling interrupts,
  d) Clearing and enabling the checksums,
  e) Executing for a prescribed number of cycles, and
  f) Reading and comparing the contents of the checksum registers with predetermined results.

The control signals may include interrupt signals, instruction addresses, and/or other signals generated by the execution of the test and captured by the checksum prior to being disabled. Alternatively, some amount of encoded instructions may be loaded into the I-cache, and encoded data into the D-cache to perform partial or full diagnostic tests. In this manner, the LFSR, transformation logic and checksums may be used to perform processor BIST or to aid in processor diagnostic tests.

It will be appreciated by persons skilled in the art that the present invention is not limited by what has been particularly shown and described hereinabove. Rather the scope of the present invention includes both combinations an sub-combinations of various features described hereinabove as well as modifications and variations which would occur to persons skilled in the art upon reading the foregoing description and which are not in the prior art.

I claim:
1. A multi-processor system having two or more processors, each processor including:
    an instruction unit for processing instructions;
    an execution unit for operating on data
    at least one cache memory;
    at least one interface to a system bus;
    logic configured to translate instructions accessed by the instruction unit from a cache memory; and
    logic between the execution unit and a cache for translating data;
    wherein translating the instructions, the data, or both uses pseudo-random numbers, and
    wherein the logic configured to translate instructions includes logic configured to decrypt encoded instructions, and the logic configured to translate data includes logic configured to translate data being accessed by the execution unit and logic configured to encrypt data being written to the cache.
2. The multi-processor system as in claim 1, wherein the logic configured to translate instructions includes a linear feedback shift register (LFSR), and wherein the logic configured to translate data includes code transformation logic.
3. The multi-processor system as in claim 2, wherein the LFSR includes a programmable LFSR.
4. The multi-processor system as in claim 1, wherein the logic configured to translate data includes logic configured to selectively encrypt data written to the system bus.
5. The multi-processor system as in claim 1, wherein the at least one cache memory includes an instruction cache and a data cache.
6. The multi-processor system as in claim 5, wherein the logic configured to translate instructions is configured to access the instruction cache, and wherein the logic configured to translate data is configured to access the data cache.
7. A multi-processor system having two or more processors, each processor including:
    an instruction unit for processing instructions;
    an execution unit for operating on data;
    at least one cache memory;
    at least one interface to a system bus; and
    logic configured to translate data and instructions transferred between the system and a further cache memory;
    wherein the logic configured to translate instructions and data includes logic configured to translate instructions that includes logic configured to decrypt encoded instructions and logic configured to translate data that includes logic configured to decrypt data being accessed by the execution unit and to encrypt data being written to the cache.
8. An integrated circuit including the multi-processor system as in claim 7.
9. A method for encrypting instructions and data of a program of a processing system, the method including:
    creating initial codes and loading a linear feedback shift register (LFSR) with one of the initial codes;
    for a respective instruction, incrementing an LFSR function to obtain a translation code for the respective instruction;
    for a respective data space, defining a translation code, loading an LFSR with the translation code, and incrementing the LFSR, to obtain a translation code for a respective predefined data element corresponding to the respective data space;
    for a respective selected instruction, appending to the selected instruction a translation code corresponding to a value in an address field of the selected instruction;

encoding a respective instruction, data and appended translation code with a translation code associated with an address of the respective instruction; and separately encrypting the initial codes.

10. The method as in claim 9, wherein the instructions include:

instructions for loading and storing registers containing addresses;

branch instructions; and instructions for calling and returning from subroutines.

11. The method as in claim 9, wherein the LFSR is a programmable LFSR, and wherein creating initial codes includes programming the LFSR with one of the initial codes.

* * * * *